J. I. HALL.
TIRE PROTECTOR.
APPLICATION FILED AUG. 27, 1910.
1,003,356.
Patented Sept. 12, 1911.
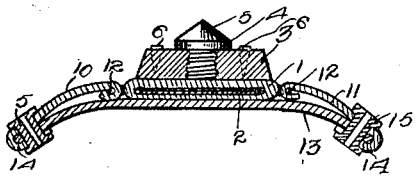
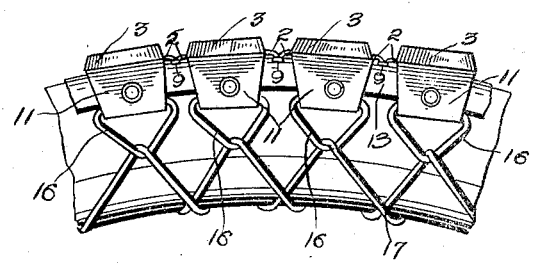
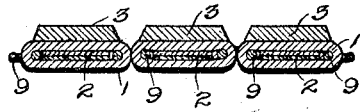
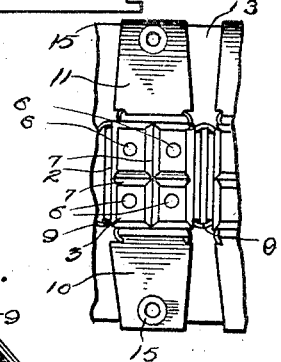
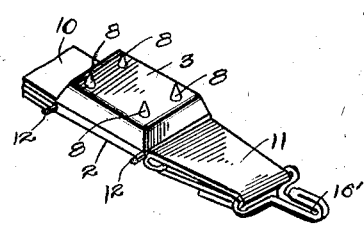
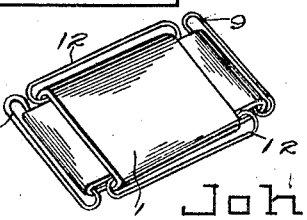
Witnesses
Howard F. Costello.
Ross J. Woodward.
Inventor
John I. Hall.
By E. E. Crosman
Attorney

UNITED STATES PATENT OFFICE.

JOHN I. HALL, OF EAST WORCESTER, NEW YORK, ASSIGNOR OF ONE-HALF TO EGBERT SNYDER, OF EAST WORCESTER, NEW YORK.

TIRE-PROTECTOR.

1,003,356.  Specification of Letters Patent.  Patented Sept. 12, 1911.

Application filed August 27, 1910. Serial No. 579,292.

*To all whom it may concern:*

Be it known that I, JOHN I. HALL, a citizen of the United States, residing at East Worcester, in the county of Otsego and State of New York, have invented certain new and useful Improvements in Tire-Protectors, of which the following is a specification, reference being had therein to the accompanying drawing.

This invention relates to tire protectors, and the principal object of the same is to provide a tire protector which will conform to the contour of the tire and which will permit the tire to have the same resiliency which it had before the protector was applied.

This invention is illustrated in the accompanying drawings wherein:—

Figure 1 is a sectional view through one section of the protector. Fig. 2 is a side plan view of a portion of the tire provided with the improved protector. Fig. 3 is a longitudinal sectional view through the improved protector. Fig. 4 is a top plan view of the protector and shows a slightly modified form of tread. Fig. 5 is a perspective view showing still another modification of the tread, and Fig. 6 is a perspective view of one of the links of the protector.

Referring to the accompanying drawings by numerals, it will be seen that the protector comprises a plurality of sections which are connected together so that a flexible protector is provided which can be placed around the tire and detachably secured to the same. Each of the sections comprises an uneven number of links, the central one of which comprises an outer loop 1 and an inner loop 2, which is passed transversely through the outer link. It will, of course, be obvious that the loop 1 can be passed through the loop 2 instead of surrounding it without diverging from the applicant's invention, as this would be an immaterial change. The outer loops are provided with treads 3 which are preferably formed of leather or of metal or rubber, and which are provided with anti-slipping cleats.

In Fig. 1 I have shown a cleat having the threaded shank 4 and an enlarged head 5 and also a number of smaller cleats 6. Fig. 4 shows the tread provided with grooves 7 and the small cleats 6 similar to those used in Fig. 1. Fig. 5 shows the tread provided with cleats 8 somewhat similar to the cleats 6 but provided with pointed heads and Fig. 3 shows the treads without cleats.

The central links are connected together by wires 9 which pass through the end portions of the loop 2 and hold the sections in pivotal relation. Each of the sections is provided with links 10 and 11 which are connected with the loops 1 by means of the wires 12 so that the links can conform to the contour of the tire.

The protector is provided with a lining 13 which fits into the inturned end portions of the links 10 and 11 and is held at intervals by the rivets 15. Eyes 16 are connected to each of the links 10 and 11 and which are preferably formed as shown in Fig. 2, but which may be formed as shown in Fig. 5. A lacing 17 is threaded through the eyes and thus holds the tire protector upon the tire.

It will thus be seen that the tire protector is securely held to the tire and will thus protect the tire from punctures.

Having thus described my invention, I claim:—

A device of the character described formed of a plurality of sections each of said sections formed of a plurality of links, the central one of said links comprising a pair of loops, one of said loops being placed transversely within the other of said loops, and means for securing said protector to a tire.

In testimony whereof I hereunto affix my signature in presence of two witnesses.

JOHN I. HALL.

Witnesses:
  IRA MAMERY,
  HARRY MILLER.